United States Patent
Funatani

(10) Patent No.: US 6,512,898 B2
(45) Date of Patent: Jan. 28, 2003

(54) IMAGE FORMING APPARATUS FOR DETECTING THE DENSITY OF TONER

(75) Inventor: Kazuhiro Funatani, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/852,748

(22) Filed: May 11, 2001

(65) Prior Publication Data

US 2002/0006288 A1 Jan. 17, 2002

(30) Foreign Application Priority Data

May 15, 2000 (JP) ...................................... 2000-141350

(51) Int. Cl.[7] .............................................. G03G 15/00
(52) U.S. Cl. ............................................ 399/49; 399/72
(58) Field of Search .............................. 399/49, 60, 64, 399/72, 74; 347/131; 358/298, 300, 504, 526

(56) References Cited

U.S. PATENT DOCUMENTS

| | | | | |
|---|---|---|---|---|
| 5,107,302 A | * | 4/1992 | Bisaiji | 399/49 |
| 5,625,857 A | * | 4/1997 | Shimada et al. | 399/49 |
| 5,761,570 A | * | 6/1998 | Sawayama et al. | 399/49 |
| 5,933,680 A | * | 8/1999 | Nishimura | 399/49 |
| 6,081,678 A | * | 6/2000 | Kato | 399/49 |
| 6,215,968 B1 | * | 4/2001 | Uehara et al. | 399/49 |

FOREIGN PATENT DOCUMENTS

| | | |
|---|---|---|
| JP | 5249787 | 9/1993 |
| JP | 6250480 | 9/1994 |

* cited by examiner

Primary Examiner—Hoan Tran
(74) Attorney, Agent, or Firm—Fitzpatrick, Cella, Harper & Scinto

(57) ABSTRACT

An image forming apparatus, that can detect the density of toner, includes an image bearing member and an image forming unit, for forming an image on the image bearing member, that is used to form a predetermined detection pattern. The image forming apparatus further includes a detector that detects light reflected from the predetermined detection pattern when light strikes the predetermined detection pattern. The detector includes a detection face to detect the reflected light in a direction with respect to a normal line of a face where the detection pattern is supported, symmetrical to a direction in which the light strikes the detection pattern. Still further, the apparatus includes a controller, based on the detection result obtained by the detector, for controlling an image forming condition for the image forming unit, where the detection pattern detected by the detector comprises a color toner. The detection pattern includes a first pattern having a regular reflection element and an irregular reflection element, and a second pattern that substantially has only an irregular reflection element.

10 Claims, 13 Drawing Sheets

PORTION REPEATED
PATTERN FILLED
6 DOTS OF 4×4 DOT MATRIX    SOLID IMAGE PORTION

FIG. 11
| HALFTONE PORTION | SOLID IMAGE PORTION |
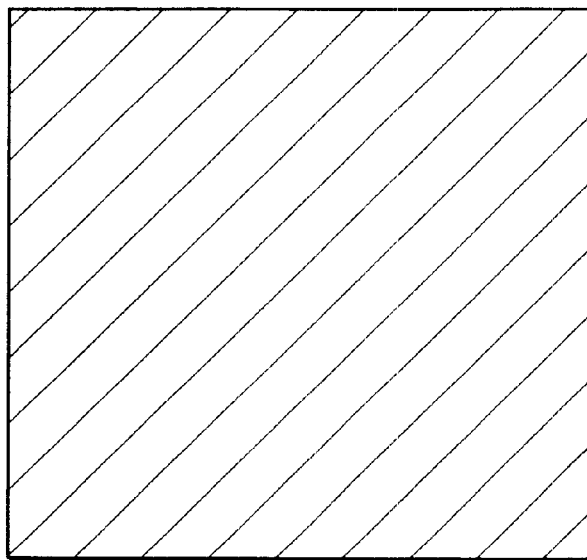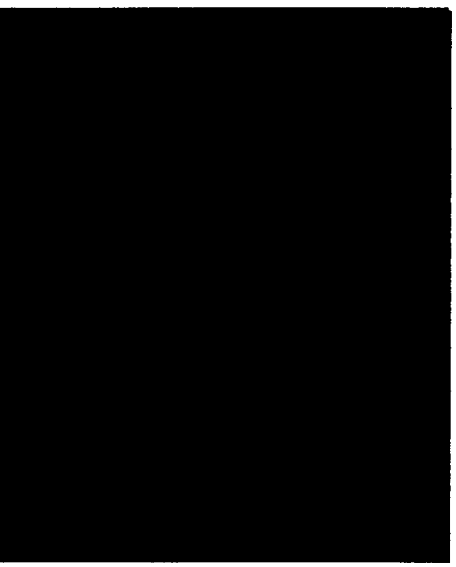

IMAGE FORMING APPARATUS FOR DETECTING THE DENSITY OF TONER

BACKGROUND OF THE INVENTION

1. Field of the Invention

The present invention relates to an image forming apparatus, such as an electrophotographic apparatus.

2. Related Background Art

Of the various systems employed for image forming apparatuses, including electrophotographic systems, thermal transfer systems and ink-jet systems, the electrophotographic systems, which, above all, supply higher speeds, better image quality and lower noise, are demonstratively superior to the others and are widely employed.

But among the electrophotographic systems, variations also exist, and include, for example: conventionally known multiple transferring systems and intermediate transferring member systems; multiple developing systems, for superimposing color images on the surfaces of photosensitive members and collectively transferring the images to form final images; and in-line systems, for arranging in series multiple image forming means (process stations) employing different colors and for transferring developed images to transferring materials using transfer belts.

Of these electrophotographic systems, the in-line systems are superior because they provide high processing speeds and because, since they require only a small number of transfer revolutions, there is less deterioration of the quality of the images they produce.

FIG. 20 is a diagram showing the partial configuration of a conventional image forming apparatus that uses an in-line system. In FIG. 20, an electrostatic adsorption transfer belt (hereinafter referred to as an ETB) 1 is fitted around a drive roller 7, an opposite adsorption roller 6 and tension rollers 8 and 9, and is rotated in the direction indicated by an arrow.

Process stations 201 (yellow), 202 (magenta), 203 (cyan) and 204 (black), which are processors that correspond to components of the invention, are arranged in series, and photosensitive members at the process stations 201 to 204 maintain contact with transferring rollers 3 via the ETB 1.

An adsorption roller 5, which is located upstream of the process stations, maintains contact with the opposite adsorption roller 6. A bias is applied to a transferring material that is passed through a nip formed by the adsorption roller 5 and the opposite adsorption roller 6, and while electrostatically attracted to the ETB 1, the transferring material is conveyed in the direction indicated by the aforementioned arrow.

The design of the conventional ETB 1 provides for a surface layer composed of urethane rubber, wherein a fluorocarbon resin such as PTFE, for example, is diffused, to be deposited on a base layer that is formed of a resin film, such as PVdF, ETFE, polyimido, PET or polycarbonate, having a thickness of 50 to 200 $\mu$m and a volume resistivity of $10^9$ to $10^{16}$ $\Omega$cm, or on rubber, such as EPDM, having a thickness of 0.5 to 2 mm.

The image forming processing will now be described. First, the image forming process performed by a process station will be explained while referring to FIG. 21. FIG. 21 is a diagram showing the configuration of one of the process stations with which the image forming apparatus in FIG. 20 is equipped. The yellow process station 201 is employed in this explanation; however, the same process is performed by the other process stations.

In the configuration of the process station in FIG. 21, a photosensitive member 211, which is an image bearing member that corresponds to a component of the invention, is uniformly electrified by an electrifier 212, electrification means that corresponds to a component of the invention. A latent image is formed on the photosensitive member 211 by the emission of a scan light 214 by a light exposure system 213.

This latent image is developed by a developing roller 215, which corresponds to a developing device component of this invention, using toner contained in a toner container 216, and a toner image is formed on the photosensitive member 211. Residual toner, which is not transferred during a transferring process that will be described later, is scraped off by a cleaning blade 217 and is collected in a waste toner container 218.

The transferring process will now be described. When an OPC photosensitive member having a negative polarity is employed as the photosensitive member, the commonly employed inverted developing system uses negative toner to develop the light exposed portion. Therefore, a positive transfer bias is applied to the transferring roller 3 by a bias power source 4. In this case, a low resistant roller is generally employed as the transferring roller 3.

In the actual printing process, while taking into account the speed at which the ETB 1 moves and the distance between the transferring positions of the process stations, the image forming and transferring process for the process stations and the conveying of the transferring material are performed at a timing whereat the positions of the individual color toner images formed on the transferring material are matched, and after the transferring material has been passed through all the process stations 201 to 204, a toner image is formed on the transferring material. After the formation of the toner image on the transferring material is completed, the transferring material is passed through a well known fixing apparatus (not shown), and the toner image is fixed thereon.

After the above process has been completed, the ETB 1 is de-electrified by a charging/charge eliminating device 11, and is ready for the next print process.

The image density varies depending on the temperature and humidity conditions whereunder the image forming apparatus is used, and the usage condition of the process stations. In order to compensate for image density changes, control of image density is exercised. The image density control process will now be described.

To control image density, conventionally, means is employed for forming density patch images of individual colors on the photosensitive member, an intermediate transferring member (hereinafter referred to as an ITB) or the ETB, and for permitting a density sensor 13, which is a detection means component of the invention, to read the density patch images and feed them back to the process forming condition, such as a high voltage condition or the power for a laser, so that the maximum densities of the individual colors and the halftone characteristics match.

Generally, the density sensor 13 employs a light source to irradiate the density patch, and employs a light receiving sensor to detect the intensity of reflected light. A/D conversion is performed for the signal indicating the intensity of the reflected light, and the obtained signal is processed by a CPU 15, which constitutes means for controlling detection pattern forming means, which is a component of the invention, and the image forming condition, and the results are fed back to the process forming condition.

The image density control process has the objectives of constantly maintaining maximum individual color densities (hereinafter referred to as Dmax control) and of linearly maintaining the halftone characteristic of an image signal (hereinafter referred to as Dhalf control).

Dmax control can effectively maintain a constant balance between the individual colors, and can prevent dispersion or a color-superimposed character fixing failure due to the piling up of too much toner.

Specifically, in the Dmax control process, multiple density patches formed under different image forming conditions are detected by an optical sensor, a condition wherein a desired maximum density can be obtained is calculated by using the detection results, and the image forming condition is changed. In most cases, it is preferable that the density patch be formed using halftone.

For this reason, when a so-called solid image is detected, the width of a change in the sensor output relative to a change in the toner quantity is reduced, and satisfactory detection accuracy can not be obtained.

During the Dhalf control process, image processing is performed for canceling the non-linear input/output characteristic ($\gamma$ characteristic), unique to electrophotography, and for maintaining the linear input/output characteristic, to prevent a phenomenon that occurs due to the non-linear $\gamma$ characteristic, the output density is shifted to an input image signal and a natural image can not be formed.

Specifically, multiple density patches for which different input image signals are provided are detected by an optical sensor, and the relationship between the input image signal and the density is obtained. Then, an image signal input to the image forming apparatus is converted by the controller of the image forming apparatus, so that in accordance with the relationship a desired density is obtained from an image signal received from a host computer. Generally, Dhalf control is exercised after Dmax control has determined the image forming condition.

The process station employs a cleaning process to electrostatically collect the density patch formed on the ETB. During the cleaning process, a bias having a polarity opposite to that of the toner is applied to the photosensitive member, the toner is attracted to the photosensitive member by the transferring unit, and, as well as the residual transfer toner, is scraped off by the cleaning blade 14.

However, the following problem afflicting the conventional technique has arisen. In the above description, generally the density sensor irradiates the density patch using a light source, and the light receiving sensor detects the intensity of the reflected light. This system is roughly divided into two systems.

A system for detecting an irregular reflection element (or component) of reflected light A system for detecting a regular reflection element (or component) of reflected light A system for detecting an irregular reflection element will now be described in detail. An irregular reflection element is a reflection element sensed as a color, and the quantity of the reflected light is characterized by being increased in accordance with an increase of the amount of color material in a density patch, i.e., the amount of toner (FIG. 16). FIG. 16 is a graph showing the relationship between the irregular reflection light quantity and the toner quantity that is used both for the conventional image forming apparatus and the image forming apparatus of this invention.

Further, the reflected light is also characterized by being uniformly diffused in all directions from the density patch (FIG. 17). FIG. 17 is a conceptual diagram showing the relationship between the emitted light that strikes the toner and the irregular light reflection, and applies both to the conventional image forming apparatus and the image forming apparatus of this invention.

The density sensor for detecting an irregular reflection element is designed so that, as is shown in FIG. 18, in order to remove the affect of the regular reflection element, which will be described later, the irradiation angle $\alpha$ differs from the light receiving angle $\beta$. FIG. 18 is a diagram showing an example structure for the density sensor for detecting the irregular reflection light.

However, when this density sensor for detecting irregular reflection is used to detect the density of black toner, no reflected light can be detected by the density sensor because black toner absorbs light.

Therefore, in this case, a method is proposed whereby a colored background, for example, is employed for the density patch, and the amount of light reflected from the background and hidden due to the black toner is measured, so that the density of the black toner can be detected.

When the in-line image forming system, including multiple photosensitive members, as explained previously for the prior art, is employed, as one example method, the formation and detection of a density patch on the photosensitive member are not performed in order to reduce the number of density sensors, a density patch formed on the ETB or the ITB, and only one density sensor is used to detect the densities of all the colors.

However, the resistance values of the transfer belt and the intermediate transfer member must be adjusted, so that the sheet feeding force and the image stability on the intermediate transferring member are maintained. Thus, in many cases, carbon black is diffused, depositing a black or dark gray covering on the transfer belt and the intermediate transferring member.

Therefore, to detect the density of black toner on the ETB (ITB), light is not reflected either from the density patch or the background (or substrate), so that the density sensor for detecting an irregular reflection can not detect the black toner. Thus, the density sensor for detecting regular reflection light, which will be described later, must be employed.

The system for detecting a regular reflection element of reflected light will now be described in detail. The sensor for detecting regular reflection light detects light reflected at irradiation angle a in a direction symmetrical to the normal line of the background face (ETB face), as is shown in FIG. 3. FIG. 3 is a conceptual diagram showing the relationship between irradiated light and regular reflection light that is applied both for the conventional image forming apparatus and the image forming apparatus of the invention.

The quantity of irregular reflection light depends on the reflectivity that is determined by a refractive index inherent to the material of the background (ETB), and the surface condition thereof, and is sensed as gloss. The maximum quantity of the light is reached when no toner is present on the background.

When the density patch is formed on the background, as is shown in FIG. 4, the portion of the background whereon toner is present is hidden, and there is no reflected light. Thus, as is shown in FIG. 5, which shows the relationship between the quantity of toner in the density patch and the reflected light quantity, the quantity of the reflected light is reduced as the quantity of the toner is increased. FIG. 4 is a conceptual diagram showing the relationship between the irradiated light and the regular reflection light for a case wherein toner is present on the ETB, and FIG. 5 is a graph showing the relationship between the toner quantity and the quantity of the regular reflection light and is applied both for the conventional image forming apparatus and the image forming apparatus of this invention.

Since the density sensor for detecting regular reflection light mainly detects the light reflected by the background, but not the light reflected by the toner, the density detection is available regardless of the color of the toner or the background, and the density sensor for detecting regular reflection light is more effective than the density sensor for detecting irregular reflection light.

Further, since generally the quantity of the regular reflection elements is greater than the quantity of the irregular reflection elements, and the density sensor for detecting regular reflection light is superior in its detection accuracy, it is also preferable that the density sensor for detecting regular reflection light be used to detect the density of the toner on the photosensitive member.

When the surface of the background is changed as it is used, the quantity of reflected light also varies. Thus, for the density sensor for detecting regular reflection light the performance of a correction can be effective; for example, the quantity of light reflected from the density patch can be standardized by using the quantity of light reflected from the background, and converting the obtained light quantity into density information.

However, a problem has arisen when the density sensor for detecting regular reflection light detects color toner. As was previously described, when the density patch of color toner is irradiated with light, the quantity of irregular reflection light increases as the quantity of toner increases, and the reflected light is uniformly diffused in all directions.

Therefore, the light detected by the density sensor is the sum of the regular reflection elements and the irregular reflection elements, as is shown in FIG. 6. FIG. 6 is a conceptual diagram showing irradiated light and reflected light when color toner is detected, and is are applied both for the conventional image forming apparatus and the image forming apparatus of the invention.

The relationship between toner quantity and reflected light quantity is, as is shown in FIG. 19, the sum of the regular reflection characteristic indicated by a fine solid line and the irregular reflection characteristic indicated by a broken line, i.e., represents the negative characteristic indicated by a thick solid line. Therefore, the linearity required for the density detection can not be obtained, and the density detection accuracy is not sufficient. It should be noted that FIG. 19 is a graph showing the relationship between toner quantity and reflected light quantity when the color toner is detected by the density sensor for detecting regular reflection light, and is applied both for the conventional image forming apparatus and the image forming apparatus of the invention.

To resolve this problem, proposed are a system disclosed in Japanese Patent Application Laid-open No. 5-249787 and a system disclosed in Japanese Unexamined Publication No. Hei 6-250480. According to the first system, a density sensor or a light receiving element for detecting irregular reflection and a density sensor or a light receiving element for detecting regular reflection detection are provided, so that color toner is detected using the irregular reflection element, and black toner is detected using the regular reflection element. According to the second system, a polarization plate is provided in front of a light emitting element and a light receiving element, and only the regular reflection element is fetched by using a difference between the polarized conditions of the irregular reflection element and the regular reflection element. However, either system increases the cost of the density sensor.

SUMMARY OF THE INVENTION

It is one objective of the invention to provide an image forming apparatus wherein even a density sensor having a simple structure of a regular reflection detection type can accurately detect the density of toner.

BRIEF DESCRIPTION OF THE DRAWINGS

FIG. 11 is a schematic diagram showing a density patch for Dhalf control for an image forming apparatus according to a second embodiment of the invention;

DETAILED DESCRIPTION OF THE PREFERRED EMBODIMENTS

Figure 1:
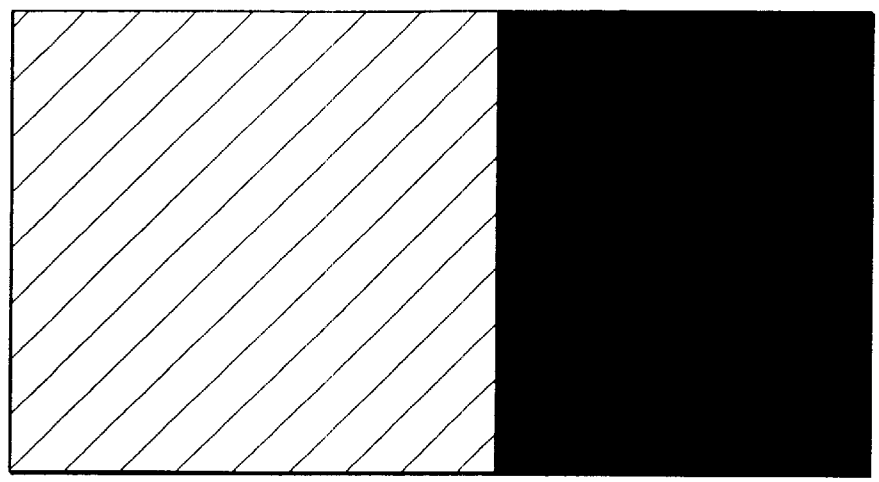
FIG. 1 is a schematic diagram showing a density patch formed by an image forming apparatus according to a first embodiment of the invention.

The preferred embodiments of the present invention will now be described in detail while referring to the accompanying drawings. It should be noted that, unless otherwise specifically stated, the size, the material, the shape and the relative locations of the components according to these embodiments of the invention are not so provided that they limit the scope of the invention.

In the following drawings that are cited, the same reference numerals as are used for members in the drawings used for the explanation of the prior art and the invention are used to denote corresponding components. Further, explanations for the image forming apparatuses of the individual embodiments also serve as explanations for the image forming methods of the individual embodiments.

First Embodiment

An image forming apparatus according to a first embodiment of the invention will now be described while referring to the accompanying drawings. However, the embodiment of the present invention is not limited to this apparatus, and only the characteristic portion of the invention will be described.

FIG. 1 is a schematic diagram showing density patches, which are formed by the image forming apparatus of the first embodiment of the invention, constituting a detection pattern and a compensation pattern, components of the invention. The same references as used for the prior art are used to denote corresponding or identical components, and no further explanation for them will be given. In other words, the structure of the image forming apparatus according to the invention is the same as the structures shown in FIGS. 20 and 21. An explanation will be given while referring also to FIGS. 20 and 21.

Figure 2:
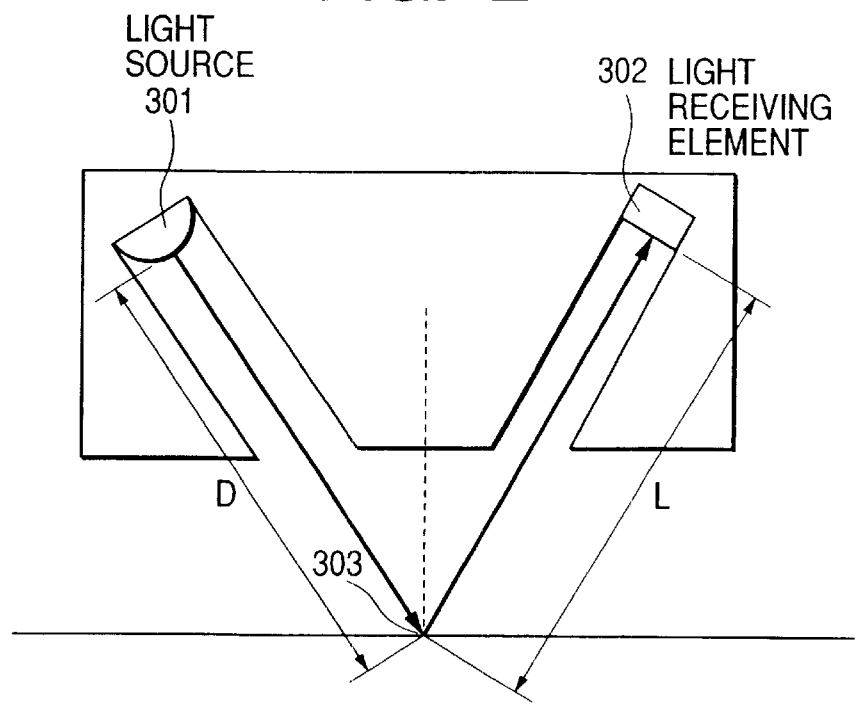
FIG. 2 is a diagram showing the structure of a density sensor of a regular reflection light detection type and is applied for the image forming apparatus according to the first embodiment of the invention.
Figure 20:
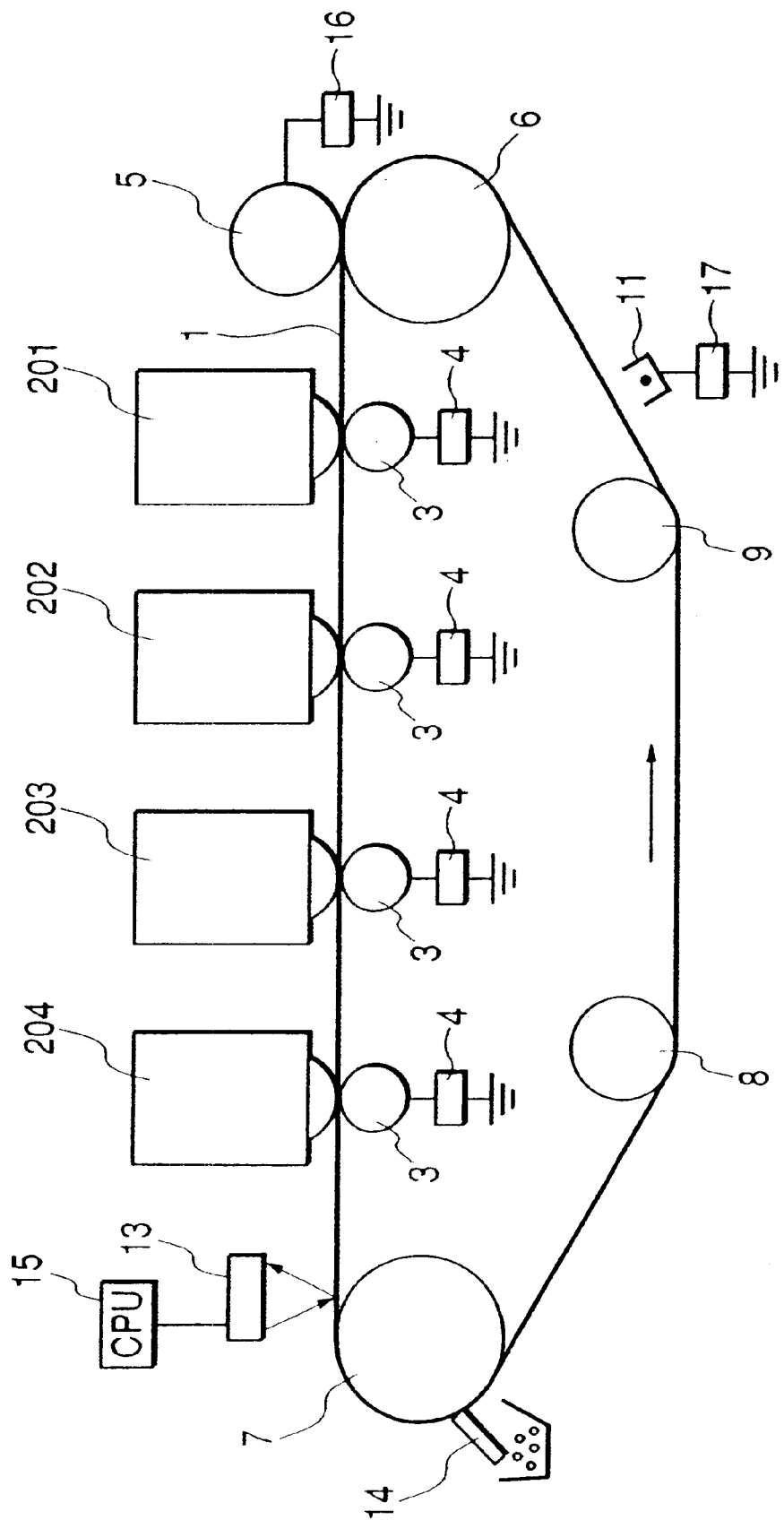
FIG. 20 is a diagram showing the structure of one part of the conventional image forming apparatus.
Figure 21:
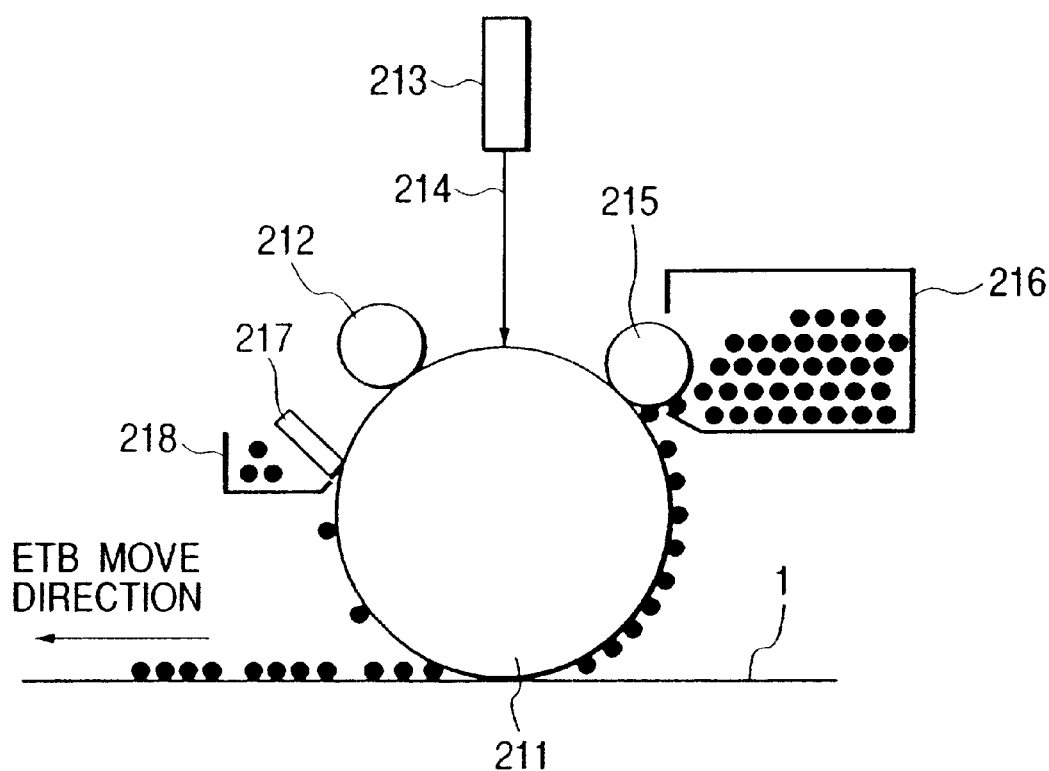
FIG. 21 is a diagram showing the structure of a process station included in the image forming apparatus shown in FIG. 20.

In this embodiment, a resin film of PVdF having a circumferential length of 800 mm and a thickness of 100 $\mu$m is employed as the ETB 1 in FIG. 20. The optical sensor in FIG. 2 is employed as the detection means for the invention. The optical sensor will now be described. FIG. 2 is a diagram showing the structure of a density sensor for detecting regular reflection light, which is applied for the image forming apparatus of this embodiment.

The optical sensor in FIG. 2, which is the detection means of the embodiment of the invention, includes a light emitting element 301, such as an LED, and a light receiving element 302, such as a photodiode.

The light emitted by the light emitting element 301 strikes ETB 1 at an angle of 30°, and is reflected at a detection location 303. Another angle may be used for this incident angle. The light receiving element 302 is located at a position whereat the light is reflected at the same angle as is employed for the incident light.

A detailed explanation will now be given for the characteristic of the reflected light that is detected when the density patch is detected by the optical sensor.

Figure 3:
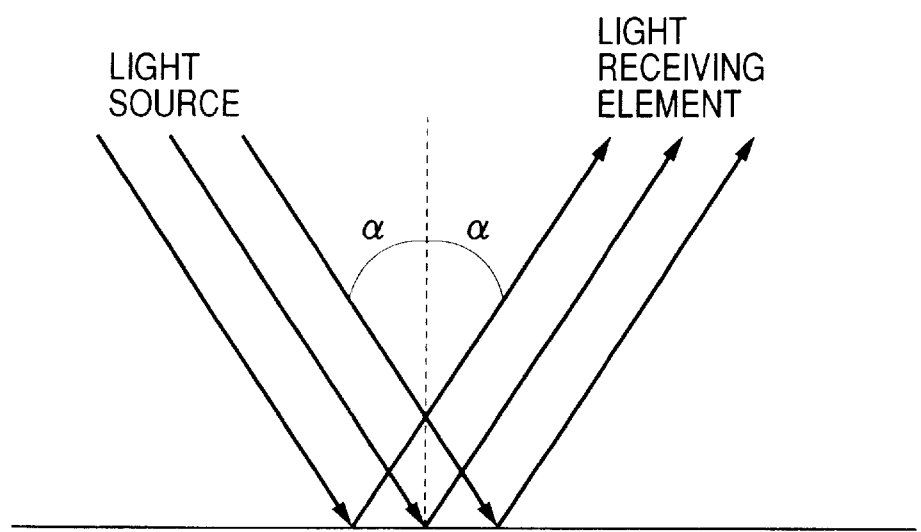
FIG. 3 is a conceptual diagram showing the relationship between irradiated light and regular reflection light and is applied both for a conventional image forming apparatus and the image forming apparatus of the invention.
Figure 4:
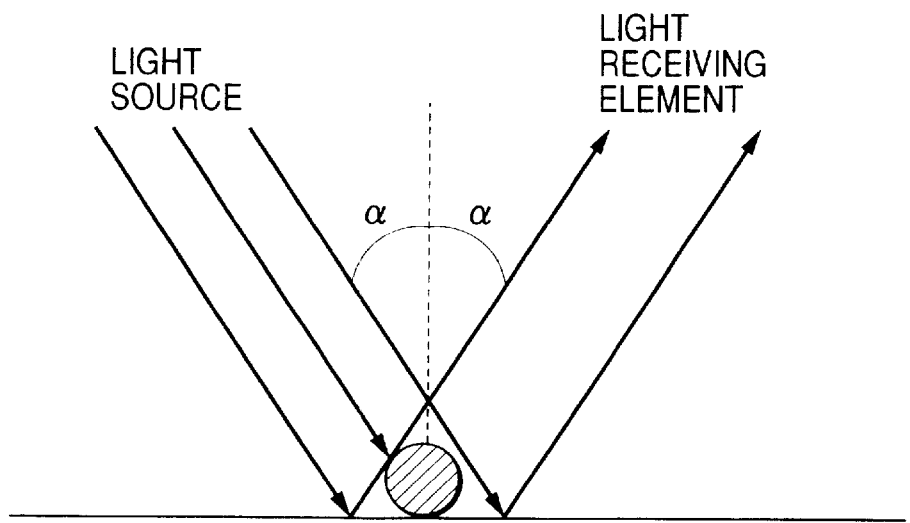
FIG. 4 is a conceptual diagram showing the relationship between irradiated light and regular reflection light when toner is present on an ETB and is applied both for the conventional image forming apparatus and the image forming apparatus of the invention.

The emitted light that strikes the ETB 1, which is the background, is reflected in accordance with the reflectivity determined by the refractive index inherent to the material of the ETB 1 and the condition of the surface, as is shown in FIG. 3, and is detected by the light receiving element 302. When a density patch is formed on the ETB 1, the portion of the ETB 1 covered by the toner is hidden, and the quantity of reflected light is reduced (FIG. 4).

Figure 5:
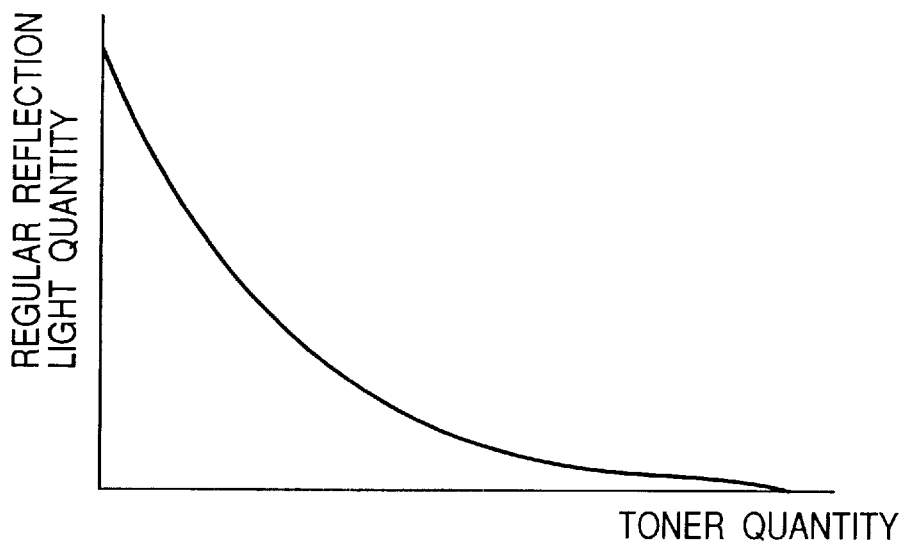
FIG. 5 is a graph showing the relationship between the quantity of toner and the quantity of regular reflection light and is applied both for the conventional image forming apparatus and the image forming apparatus of the invention.

Therefore, as is shown in FIG. 5, the quantity of reflected light is reduced as the quantity of the toner in the density patch is increased, and the density of the density patch is obtained based on the reduced quantity of reflected light. Actually, since the quantity of reflected light is changed as the surface condition of the background varies due to the usage of the ETB, generally, the quantity of light reflected by the density patch is standardized using the quantity of light reflected by the background, and the obtained light quantity is converted into density information.

However, a problem has arisen when color toner has been detected. When the color toner is irradiated with light, light sensed as a color is reflected. This reflected light is called irregular reflection light or diffused reflection light. A characteristic of the irregular reflection light is that the quantity of reflected light is increased as the quantity of color material (toner) is increased, and the light is uniformly diffused in all directions.

Figure 6:
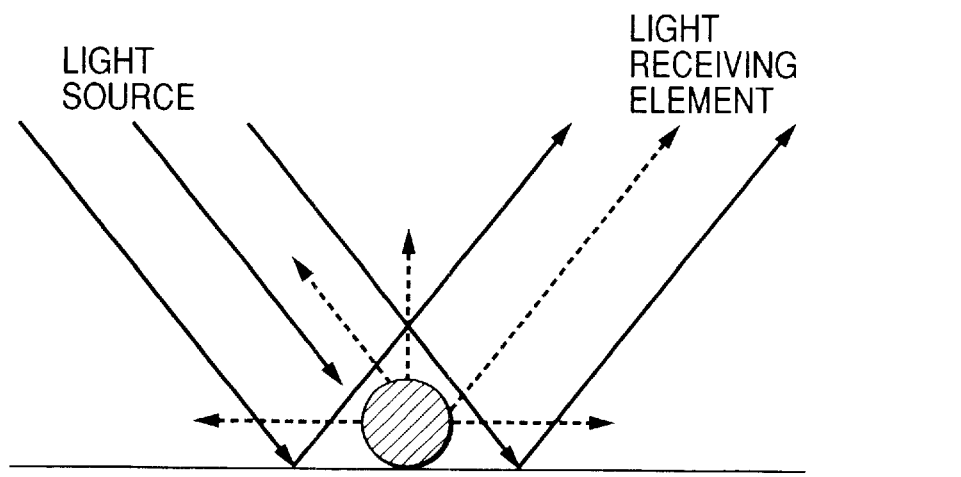
FIG. 6 is a conceptual diagram showing the relationship between irradiation light and regular reflection light when color toner is detected and is applied both for the conventional image forming apparatus and the image forming apparatus of the invention.

Therefore, the light that is detected when a density patch of color toner is detected by the optical sensor of this embodiment is the sum of the light that is reflected by the background and is reduced as the quantity of toner is increased, and the light that is reflected by the toner and that increases as the quantity of the toner increases (FIG. 6). Further, the relationship between the quantity of the toner and the quantity of reflected light has a negative characteristic shown in FIG. 19, and the linearity required for density detection can not be obtained.

Therefore, the irregular reflection element in the light quantity that is reflected when the density patch is detected may be removed, and only the regular reflection element must be extracted.

The characteristic of the irregular reflection element will now be described. As was previously explained, the irregular reflection element is increased as the toner quantity is increased.

Thus, under a fixed image forming condition, a density patch is formed by changing the exposure light quantity (more precisely, the light exposure ratio of the light exposing unit relative to a specific area), and the relationship between the quantity of exposure light and the quantity of the irregular reflection elements is examined.

Figure 7:
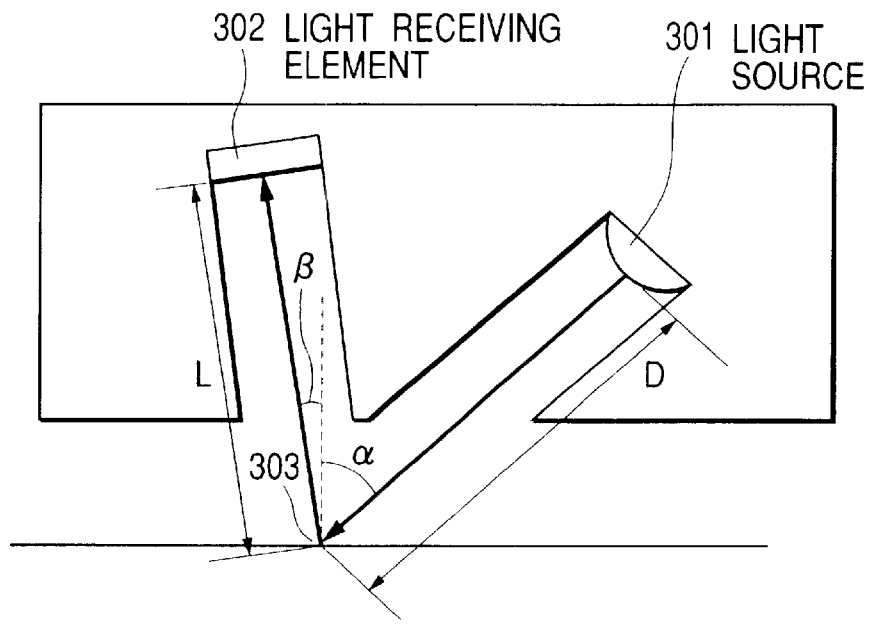
FIG. 7 is a diagram showing the structure of a sensor, for discussing the characteristic of irregular reflection light, and is applied for the image forming apparatus according to the first embodiment of the invention.

At this time, the optical sensor in FIG. 7 is employed to measure the irregular reflection element. This optical sensor is so designed that the distance from the detection location to the light receiving element is equal to that provided for the optical sensor in FIG. 2. It should be noted that FIG. 7 is a diagram showing the structure of the optical sensor that is applied for the image forming apparatus of the first embodiment and that is used to study the characteristics of the irregular reflection light.

Figure 8:
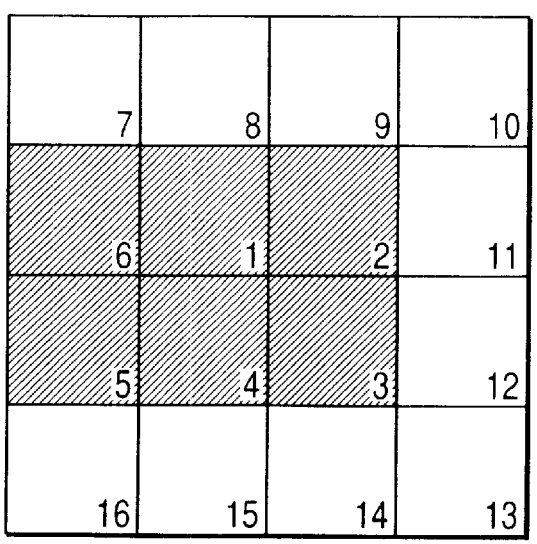
FIG. 8 is a schematic diagram showing an example 4×4 dot matrix used for the image forming apparatus according to the first embodiment of the invention.

Further, at this time, the density patch is formed by repetitive 4×4 dot matrixes such as are shown in FIG. 8, and the exposure ratio is varied by changing the number of filled dots in the matrix. FIG. 8 is a schematic diagram showing an example 4×4 dot matrix used for the image forming apparatus of the first embodiment.

Figure 9:
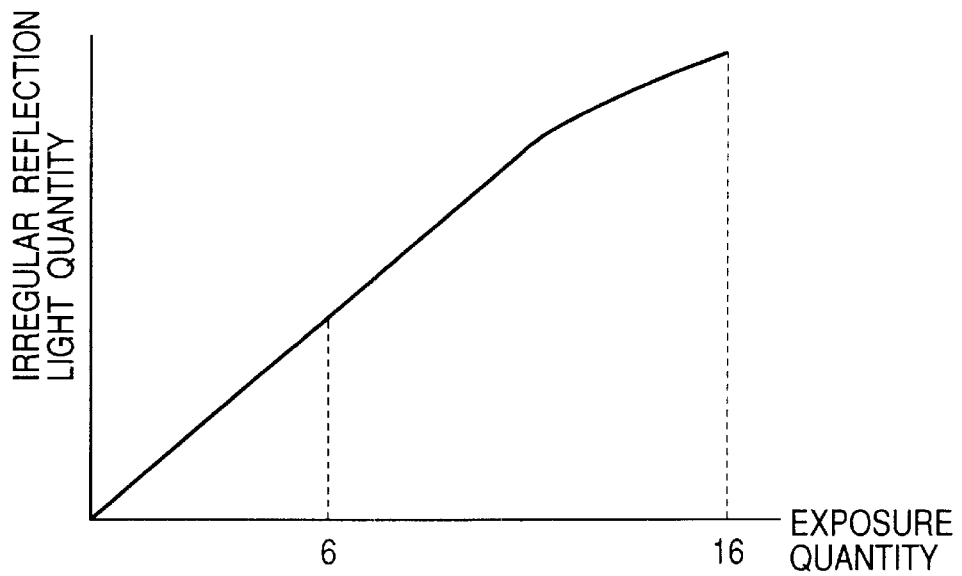
FIG. 9 is a diagram showing the relationship between the quantity of exposure light and irregular reflection light for the image forming apparatus according to the first embodiment of the invention.

The numbers in FIG. 8 indicate the order in which the dots in the matrix are filled, and the relationship between the exposure quantity and the quantity of irregular refection light is shown in FIG. 9. The numbers along the horizontal axis in FIG. 9 indicate the number of dots filled in the 4×4 dot matrix. It should be noted that FIG. 9 is a graph showing the relationship between the exposure quantity and the quantity of irregular reflection light for the image forming apparatus according to the first embodiment of the invention.

As is apparent from FIG. 9, a substantially proportional relationship is established between the exposure ratio of the dot matrix and the quantity of the irregular reflection light. That is, so long as the quantity of the irregular reflection elements for a density patch that is formed at a specific exposure ratio is obtained, the quantity of the irregular reflection elements for a patch that is formed at another exposure ratio can be predicted.

An explanation will now be given for a case wherein color toner is detected by the optical sensor in FIG. 2 that is used for the embodiment.

As was previously explained, the quantity of detected light is the sum of the regular reflection elements and the irregular reflection elements. Then, assume that a density patch formed by a so-called solid image is detected.

At this time, it can be assumed that the background is appropriately covered with toner and can not be seen, and that the regular reflection element reflected from the background is not included in the quantity of reflected light that is detected. Therefore, only the irregular reflection element is detected as the quantity of reflected light.

Thus, actually, under the condition whereunder the background is appropriately covered with toner, only the irregular reflection element can be measured by the sensor shown in FIG. 2, without requiring the use of the sensor shown in FIG. 7 to measure only the irregular reflection light.

Figure 19:
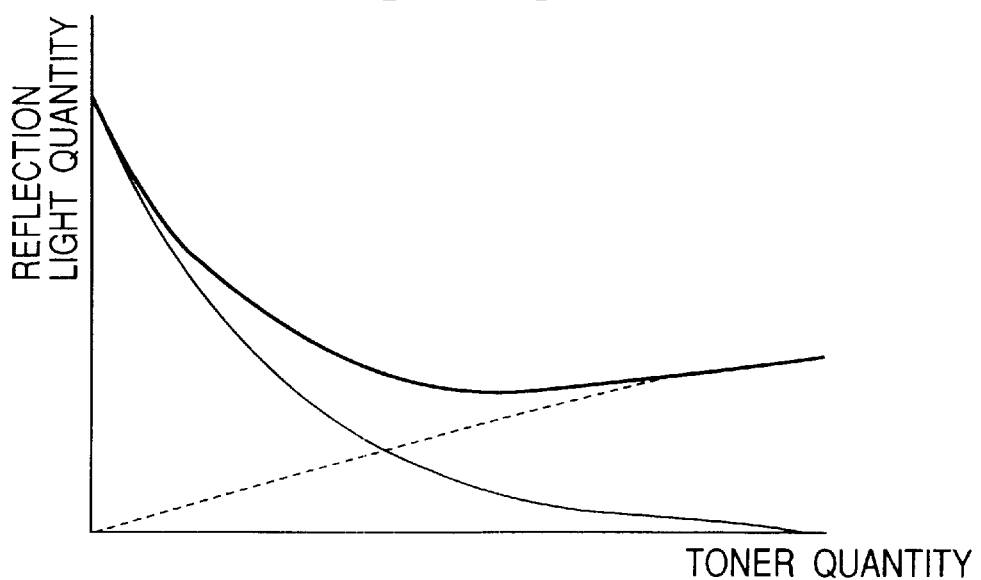
FIG. 19 is a graph showing the relationship between toner quantity and reflected light quantity, when color toner is detected by the density sensor for detecting regular reflection light, and that is applied for both the conventional image forming apparatus and the image forming apparatus of the invention.

As a result, when the halftone density patch formed for the density detection and the density patch of a solid image formed for output compensation are detected by the sensor in FIG. 2, if the quantity of irregular reflection light included in the output of the halftone density patch is predicted in accordance with the output of the solid density patch and the exposure ratio of the solid image to the halftone image, and if the predicted quantity of irregular reflection light is subtracted from the output of the halftone density patch, a quantity representing only the regular reflection light can be extracted. Therefore, the relationship indicated by a fine solid line in FIG. 19 is established between the density of the density patch and the quantity of reflection light.

When in this manner the density detection is performed by extracting the quantity representing only the regular reflection light, even for the detection of color toner, a linear relationship is established between the toner quantity of the density patch and the output of the optical sensor, so that the density detection can be accurately performed.

The Dmax control operation for the embodiment will now be described. The structure of a density patch, which is a detection pattern for the invention, is shown in FIG. 1. As is shown in FIG. 1, the density patch consists of a portion formed by repetitive patterns (FIG. 8), wherein six dots of a 4×4 dot matrix are solid (a portion that is used as a detection pattern for this embodiment to detect a density), and a portion formed as a solid image (a portion that is used as an output compensation pattern for the embodiment).

This density patch is formed on the ETB 1 by controlling the process stations. When the density patch reaches the location of the optical sensor, the output of the density sensor 13, which is the optical sensor, is fetched, and A/D conversion of this signal is performed and the resultant signal is transmitted to the CPU 15. At this time, the densities of the halftone density patch and the solid density patch are measured eight times, and their average values are used as the outputs of the density patches.

When the output of the halftone density patch portion is defined as Vh and the output of the solid density patch portion is defined as Vr, the output Vi, which represents only the regular reflection element of the halftone density patch, is calculated as $$Vi=(Vh-V0)-(Vf-V0)\times\alpha.$$

In this equation, $\alpha$ denotes a compensation coefficient of 1 at an exposure ratio of 100% or 0 at an exposure ratio of 0%. When the relationship between the exposure ratio and the current output of the irregular reflection element detected from the toner image can be approximated substantially as a linear proportional relationship, $\alpha=6/16$ may be employed. V0 denotes the output of the optical sensor when the light emitting element is turned off (that is, the output value when the density sensor 13 does not perform the detection of the output compensation pattern or the detection pattern). In this embodiment, a characteristic of the detection circuit that is employed is that the voltage output of the optical sensor is reduced as the quantity of reflected light is increased. The output Vi is converted into the density data Di in accordance with the density conversion table.

In this embodiment, the above operation is repeated five times under different image forming conditions (the development bias in this embodiment), and the density data D1 to D5 is obtained. At this time, the development bias is changed so that the density is increased in order from D1 to D5. These density data are then employed to calculate the development bias under which the optimum density (called Dt in this embodiment) is obtained for the halftone density patch.

Figure 10:
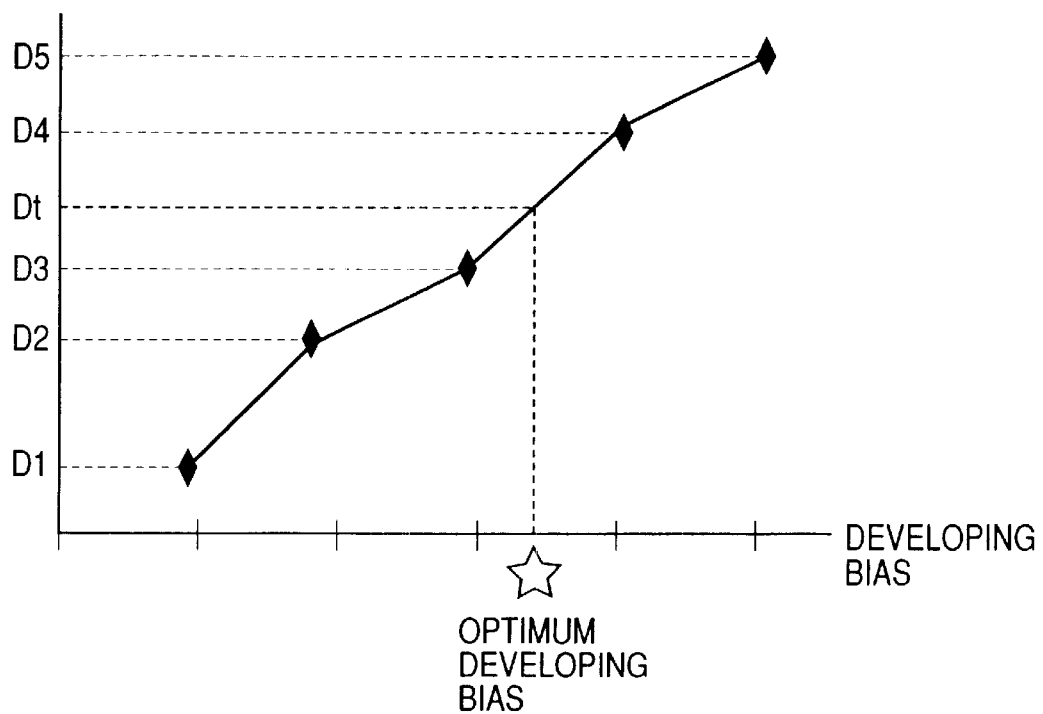
FIG. 10 is a conceptual diagram showing a method for calculating the optimal development bias for the image forming apparatus according to the first embodiment of the invention.

When all the patches have been detected, the relationship in FIG. 10 is obtained between the development bias and the density of the density patch. From this graph, the density patches are extracted from two points that sandwich the optimum density value Dt, and between the two points, linear interpolation is performed to obtain the development bias for which the density of the density patch is the optimum value Dt. It should be noted that FIG. 10 is a conceptual graph showing a method for calculating the optimum development bias for the image forming apparatus according to the first embodiment.

The above described operation is performed for all the colors, and the development bias for providing the optimum image density is calculated for the individual colors.

As is described above, in this embodiment, since for density control the output of the halftone density patch used for density detection is compensated for by using the output of the detected solid density patch, the density can be accurately controlled, even when the density of color toner is detected by the density sensor for detecting regular reflection light.

Second Embodiment

An image forming apparatus according to a second embodiment of the invention will now be described. The configuration for this embodiment, as well as for the first embodiment, is also the same as the conventional configuration explained while referring to FIGS. 20 and 21.

In this embodiment, Dhalf control will be described. For Dhalf control, the image processing for canceling the non-linear input/output characteristic (γ characteristic) unique to electrophotography and for maintaining the liner input/output characteristic is performed, so as to prevent a phenomenon whereby, due to the non-linear input/output characteristic, the output density is shifted away from the input image signal and an unnatural image is formed.

The non-linear characteristic is even more outstanding when the halftone is formed while a smaller matrix, such as 3×3 dot matrix, is employed as a unit in order to obtain a high resolution image. Specifically, for Dhalf control, multiple density patches having different input image signals are detected by the optical sensor to obtain the relationship between the input image signal and the density. And the image signal to the image forming apparatus is converted by its controller, so that, in accordance with the relationship, a desired density is obtained relative to an image signal received from a host computer (hereinafter referred to as γ compensation).

For the Dhalf control process, the compensation performed as in the first embodiment must also be performed in order to detect a color toner. Therefore, in this embodiment, as in the first embodiment, a density patch consisting of a halftone portion to be detected and a solid image portion used for compensation is employed (FIG. 11). It should be noted that FIG. 11 is a schematic diagram showing the density patch, for the second embodiment, that serves as the detection pattern and the output compensation pattern used for Dhalf control.

Figure 12:
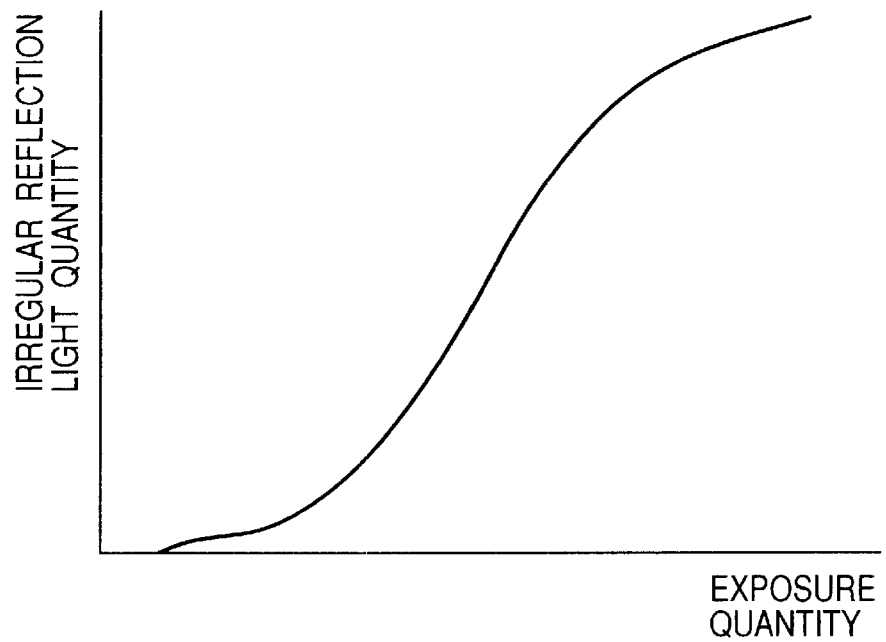
FIG. 12 is a graph showing the relationship between the quantity of irregular reflection light and the quantity of exposure light for the image forming apparatus according to the second embodiment of the invention.

However, when halftone is formed by specifically using a smaller matrix, such as a 3×3 dot matrix, as is shown in FIG. 12, an undesirable, non-linear relationship is established between the exposure quantity and the quantity of the irregular reflection light. It should be noted that FIG. 12 is a graph showing the relationship between the quantity of irregular reflection light and the quantity of the exposure for the image forming apparatus of the second embodiment.

Therefore, when, as in the first embodiment, only the ratio of the exposure quantities for the halftone image and the solid image is employed to obtain the output compensation value, the correct compensation is not available.

Figure 13:
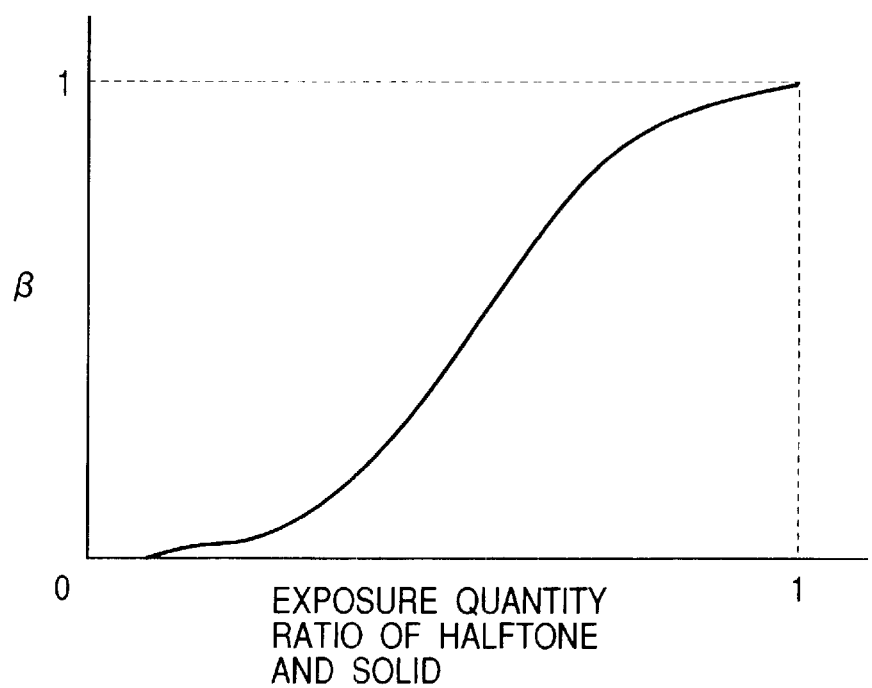
FIG. 13 is a table showing the relationship between β and a ratio of the exposure light quantity for a halftone image of the exposure light quantity for a solid image, for the image forming apparatus according to the second embodiment of the invention.

Therefore, in this embodiment, the relationship between the quantity of irregular reflection light and the ratio of the exposure quantities for the halftone image and the solid image is predicted and is used for compensation of the output. Specifically, when Vh denotes the output of the halftone density patch portion, Vf denotes the output of the solid density patch portion, and V0 denotes the output of the optical sensor, if the light emitting element is turned off (i.e., the output value when the density sensor 13 does not perform the detection of the output compensation pattern or the detection pattern), the output Vj of the halftone patch after the output has been compensated for is represented as follows.

$$Vj=(Vh-V0)-(Vf-V0)\times\beta$$

β is a value obtained from the relationship between the quantity of irregular reflection light and the ratio of the exposure quantities for the halftone image and the solid image, which is predicted in advance. This relationship is shown in FIG. 13. When the relationship can approximate a linear relationship, β may be calculated using a mathematical formula instead of the graph in FIG. 13. It should here be noted that FIG. 13 is a graph showing the relationship between β and the ratio of the exposure quantities for a halftone image and a solid image for the image forming apparatus according to the second embodiment.

The thus obtained Vi is converted into the density data Dj using the density conversion table, and the density data Dj is transmitted to the controller. The controller employs the density data Di to perform γ compensation.

The same effects as in the first embodiment are obtained using the thus provided configuration for the embodiment, and the halftone density, according to which the relationship between the exposure quantity and the image density tends to be non-linear, can be accurately detected.

Third Embodiment

An image forming apparatus according to a third embodiment of the invention will now be described. In this embodiment also, Dhalf control will be explained. In the second embodiment, as in the first embodiment, Dhalf control using the density patch consisting of the halftone image and the solid image has been explained.

However, for Dhalf control, more density patches than those for Dmax control are formed and detected. Therefore, when the density patch formed of the halftone image and the solid image is employed, the total length of the density patches is increased, and the time required for Dhalf control is increased. Therefore, the objective of this embodiment is the reduction of the time required for Dhalf control.

Figure 14:
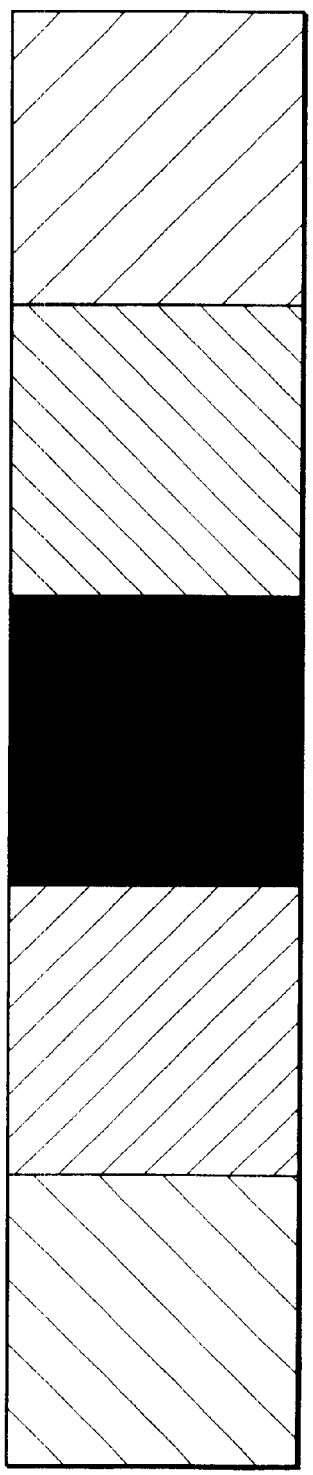
FIG. 14 is a schematic diagram showing a density patch for Dhalf control for an image forming apparatus according to a third embodiment of the invention.

In this embodiment, a predetermined number of only halftone density patches, shown in FIG. 14, are prepared to use for Dhalf control and to be detected. It should be noted that FIG. 14 is a conceptual diagram showing a density patch as a detection pattern and an output compensation pattern, used for Dhalf control for the image forming apparatus according to the third embodiment.

As explained in the first and the second embodiments, the density patch for a solid image must be detected and compensated in order to detect the halftone density.

In this embodiment, the output of the solid image used for compensation is obtained by using the output of the density patch of a solid image that is detected during Dmax control in advance of Dhalf control. This method will now be explained.

As is explained in the first embodiment, the density patches are extracted from two points that sandwich the target value of the sensor output after the compensation, and the optimum development bias is determined by the linear interpolation of the two points.

Figure 15:
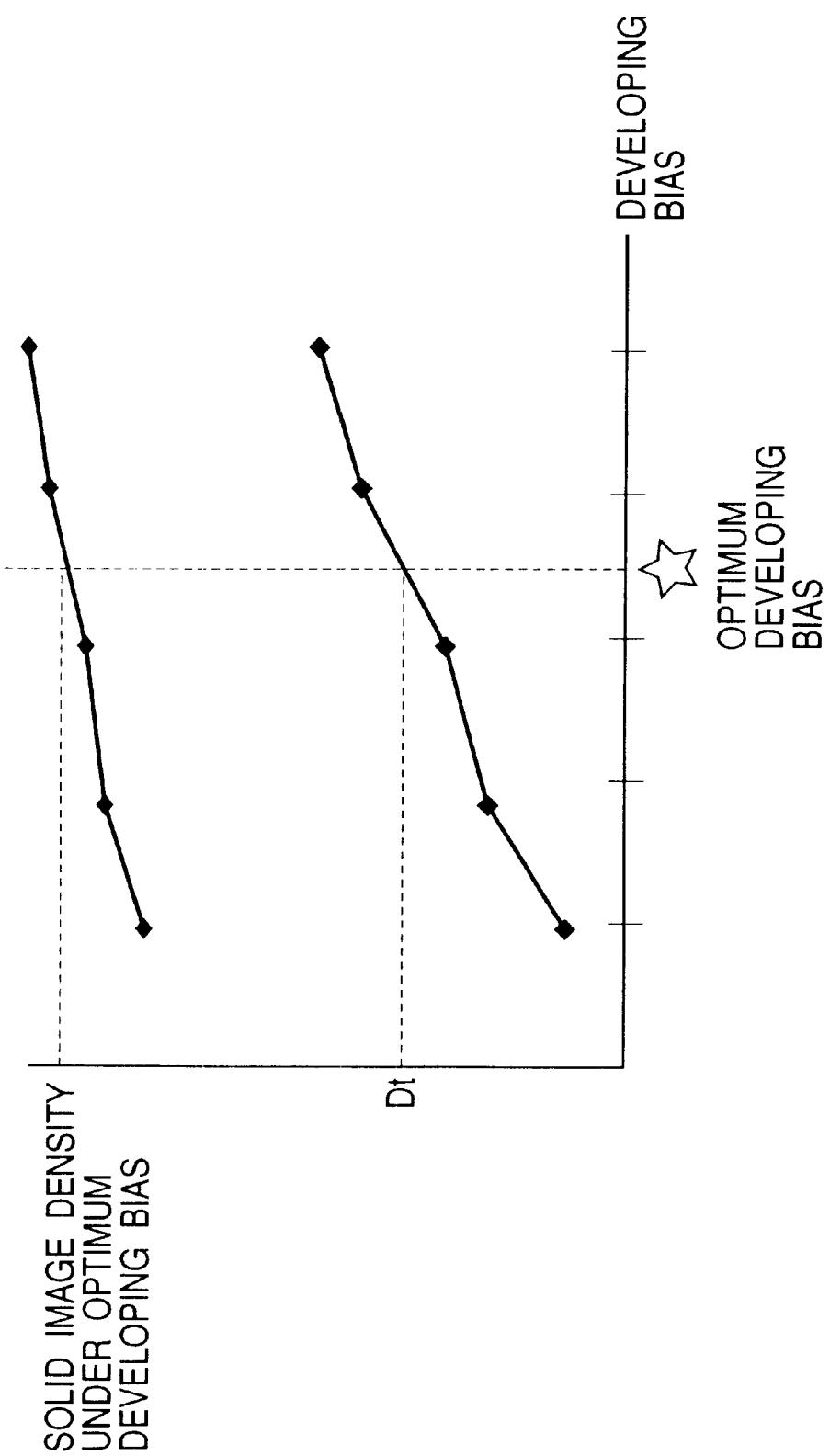
FIG. 15 is a conceptual diagram showing a method for calculating the density of a solid image upon the application of the optimum development bias for the image forming apparatus according to the third embodiment of the invention.
Figure 16:
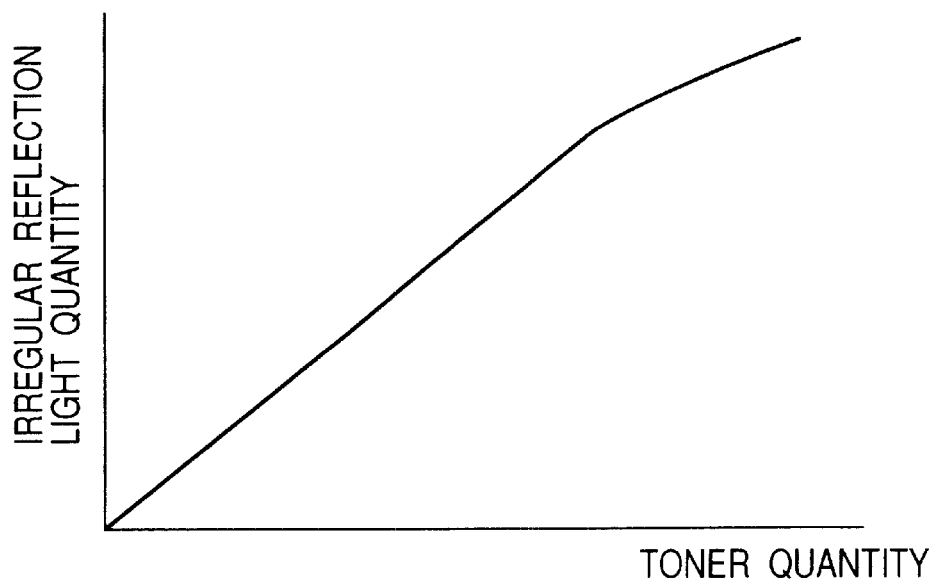
FIG. 16 is a graph showing the relationship between the irregular reflection light quantity and the toner quantity and is applied for both the conventional image forming apparatus and the image forming apparatus of the invention.
Figure 17:
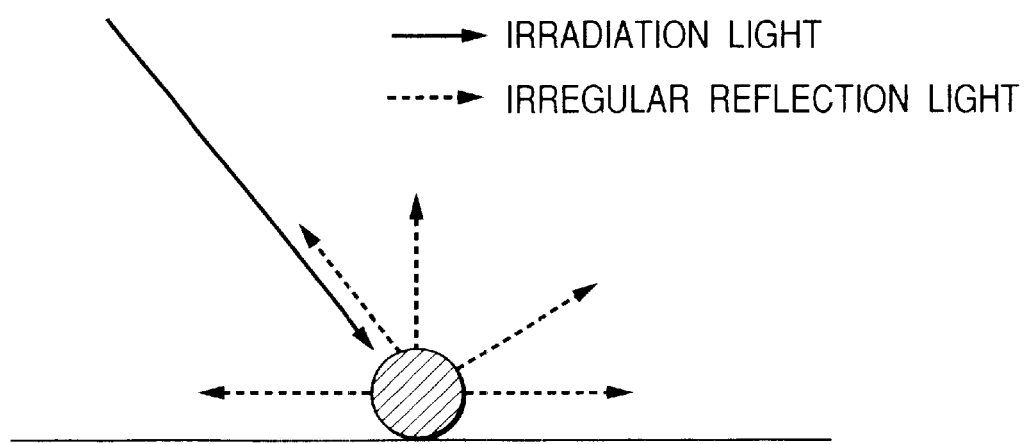
FIG. 17 is a conceptual diagram showing the relationship between light emitted to the toner and irregular reflection light and is applied for both the conventional image forming apparatus and the image forming apparatus of the invention.
Figure 18:
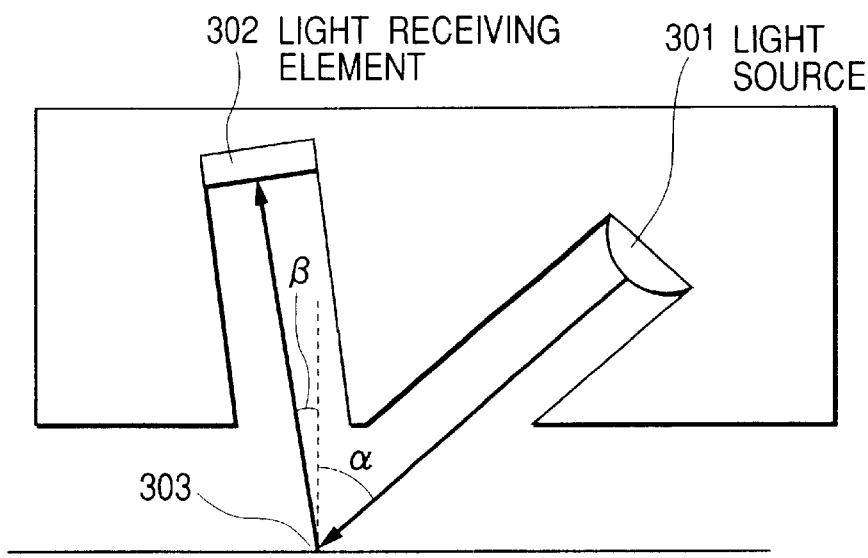
FIG. 18 is a diagram showing an example structure of the density sensor for detecting irregular reflection light and is applied both for the conventional image forming apparatus and the image forming Apparatus of the invention.

At this time, the linear interpolation is also performed for the output of the solid portion in the density patch that is formed by the development biases at two points that sandwich the optimum development bias, and the output of the solid portion upon the application of the optimum development bias is predicted (FIG. 15). It should be noted that FIG. 15 is a conceptual diagram showing the method, for the image forming apparatus according to the third embodiment, for calculating the solid image density at the time of the optimum development bias.

This output value is stored, and when Dhalf control is initiated, the density data of the density patch is obtained through the same calculation as in the second embodiment. The controller employs the obtained density data to perform γ compensation.

As is described above, in this embodiment, the same effects as in the first and the second embodiments can be obtained. Further, when the output of the solid patch at the time of the optimum development bias is obtained by using the output of the density patch consisting of the solid image that is detected during Dmax control. When the output of the solid patch is stored and used to detect the density of the halftone density patch, the size of the density patch can be reduced during Dhalf control, and the time required for Dhalf control and the amount of consumed toner can be reduced.

As is described above, according to the above embodiments, the output compensation pattern is formed and detected separately from the density detection pattern, and the output of the density detection pattern is compensated for based on the output of the output compensation pattern. Thus, a linear relationship is established between the density of the density detection pattern and the output, and accurate density control can be exercised.

Furthermore, since the output compensation value that is obtained is at the least based on the output obtained for the output compensation pattern and the ratio of the exposure quantities of the detection pattern and the output compensation pattern, more accurate density detection can be performed.

What is claimed is:

1. An image forming apparatus comprising:
   an image bearing member;
   image forming means for forming an image on said image bearing member, said image forming means being used to form a predetermined detection pattern;
   detection means for detecting light reflected from said predetermined detection pattern when light strikes said predetermined detection pattern, said detection means including a detection face to detect said reflected light in a direction, with respect to a normal line of a face whereon said detection pattern is supported, symmetrical to a direction in which said light strikes said detection pattern; and
   control means for, based on the detection result obtained by said detection means, controlling an image forming condition for said image forming means,
   wherein said detection pattern detected by said detection means comprises a color toner, said detection pattern includes a first pattern having a regular reflection element and an irregular reflection element, and a second pattern that substantially has only an irregular reflection element.

2. An image forming apparatus according to claim 1, wherein said first pattern is a halftone image pattern.

3. An image forming apparatus according to claim 1 or 2, wherein said second pattern is a pattern wherein an image is formed on a predetermined area composed of multiple dots overall.

4. An image forming apparatus according to claim 1, wherein said image bearing member is a photosensitive member, and wherein said image forming means includes electrostatic image forming means for forming an electrostatic image on said image bearing member, and developing means for employing toner to develop said electrostatic image.

5. An image forming apparatus according to claim 4, wherein said electrostatic image forming means includes exposure means for exposing said image bearing member in accordance with image information.

6. An image forming apparatus according to claim 5, wherein said second pattern is a pattern whereon toner is deposited when said exposure means is used to expose said predetermined area composed of multiple dots overall.

7. An image forming apparatus according to claim 5, wherein said image forming condition is determined in accordance with the detection results obtained by said detection means using said first and said second patterns and the exposure ratio employed by said exposure means to form said second pattern.

8. An image forming apparatus according to claim 4, wherein said image forming condition is a development condition for said image forming means.

9. An image forming apparatus according to claim 8, wherein a plurality of said second patterns are formed by changing said development condition for said image forming means, and wherein said image forming condition is determined in accordance with said plurality of second patterns.

10. An image forming apparatus according to claim 1, wherein said detection result is corrected so as to remove the irregular reflection element of said first pattern from the detection results of said first pattern by using the detection results of said second pattern.

* * * * *

UNITED STATES PATENT AND TRADEMARK OFFICE
CERTIFICATE OF CORRECTION

PATENT NO.    : 6,512,898 B2
DATED         : January 28, 2003
INVENTOR(S)   : Kazuhiro Funatani It is certified that error appears in the above-identified patent and that said Letters Patent is hereby corrected as shown below:

Title page,
Item [56], FOREIGN PATENT DOCUMENTS, "5249787" should read -- 5-249787 --; and "6250480" should read -- 6-250480 --.

Column 4,
Line 42, "angle a" should read -- angle $\propto$ --.

Column 5,
Line 31, "is are" should read -- are --.

Column 7,
Line 12, "Apparatus" should read -- apparatus --.

Column 9,
Line 18, "refection" should read -- reflection --.

Column 11,
Line 18, "liner" should read -- linear --.

Signed and Sealed this

Twenty-third Day of September, 2003

JAMES E. ROGAN
*Director of the United States Patent and Trademark Office*